(12) United States Patent
Kang et al.

(10) Patent No.: US 10,584,052 B2
(45) Date of Patent: Mar. 10, 2020

(54) ENHANCED WASTE HEAT RECOVERY USING A PRE-REFORMER COMBINED WITH OXYGEN AND FUEL PRE-HEATING FOR COMBUSTION

(71) Applicant: American Air Liquide, Inc., Fremont, CA (US)

(72) Inventors: Taekyu Kang, Newark, DE (US); Robert A. Gagliano, Cochranville, PA (US); Pavol Pranda, Hockessin, DE (US); Ashkan Iranshahi, Houston, TX (US)

(73) Assignee: American Air Liquide, Inc., Fremont, CA (US)

( * ) Notice: Subject to any disclaimer, the term of this patent is extended or adjusted under 35 U.S.C. 154(b) by 347 days.

(21) Appl. No.: 15/417,972

(22) Filed: Jan. 27, 2017

(65) Prior Publication Data

US 2018/0215641 A1    Aug. 2, 2018

(51) Int. Cl.
*C03B 5/237* (2006.01)
*F23K 5/00* (2006.01)
*F23L 7/00* (2006.01)

(52) U.S. Cl.
CPC .............. *C03B 5/237* (2013.01); *F23K 5/007* (2013.01); *F23L 7/007* (2013.01); *F23K 2401/10* (2013.01); *F23K 2900/01041* (2013.01); *Y02E 20/344* (2013.01)

(58) Field of Classification Search
CPC .................................................. F23N 2021/12
USPC .......................................................... 431/12
See application file for complete search history.

(56) References Cited

U.S. PATENT DOCUMENTS

| 7,210,467 | B2 | 5/2007 | Kweon et al. |
| 2008/0102328 | A1* | 5/2008 | Saunders ................. C01B 3/26 |
| | | | 429/410 |
| 2008/0141643 | A1 | 6/2008 | Varatharajan et al. |
| 2009/0011290 | A1 | 1/2009 | Chudnovsky et al. |
| 2009/0035713 | A1 | 2/2009 | Debski et al. |
| 2009/0104110 | A1* | 4/2009 | Peng ........................ B01J 8/008 |
| | | | 423/652 |
| 2011/0308156 | A1* | 12/2011 | Karlsson ................. B01J 4/002 |
| | | | 48/78 |

(Continued)

FOREIGN PATENT DOCUMENTS

| EP | 0 464 603 | 1/1992 |
| EP | 0 643 013 | 3/1995 |

(Continued)

OTHER PUBLICATIONS

International Search Report and Written Opinion for PCT/US2018/015378, dated Apr. 10, 2018.

*Primary Examiner* — Avinash A Savani
(74) *Attorney, Agent, or Firm* — Christopher J. Cronin

(57) ABSTRACT

Disclosed are methods for operating a glass furnace, the method comprises the steps of feeding a non-pre-reformed hydrocarbon fuel gas stream to a pre-reformer forming a pre-reformed hydrocarbon fuel gas stream, feeding the pre-reformed hydrocarbon fuel gas stream to burners of the furnace, combusting oxidant and the pre-reformed hydrocarbon fuel gas with the burners to produce flue gas, heating air through heat exchange with the flue gas at a recuperator, and transferring heat from heated air to pre-reformer tubes of the pre-reformer. A glass furnace system is also disclosed.

21 Claims, 13 Drawing Sheets

(56) References Cited

U.S. PATENT DOCUMENTS

2013/0047511 A1* 2/2013 Simell .................. C10J 3/00
                                                48/197 R
2014/0291581 A1* 10/2014 Iaquaniello ............ C01B 3/382
                                                252/373
2016/0186992 A1   6/2016 Beaudoin et al.

FOREIGN PATENT DOCUMENTS

EP        0 464 603      10/1995
EP        1 071 867       1/2001

* cited by examiner

ENHANCED WASTE HEAT RECOVERY USING A PRE-REFORMER COMBINED WITH OXYGEN AND FUEL PRE-HEATING FOR COMBUSTION

TECHNICAL FIELD

The present invention relates to systems and methods for enhancing waste heat recovery using a pre-reformer combined with oxygen and fuel preheating for combustion.

BACKGROUND

Recently preheating of oxygen-fuel with waste energy from flue gas for oxygen-fuel combustion has been demonstrated for glass industries as a promising solution to reduce natural gas consumption, thereby decreasing $CO_2$ emissions. The technology demonstrated combustion efficiency increases about 9-10%, which means 9-10% of savings of oxygen and natural gas when oxygen and natural gas are preheated to 500° C. and 450° C., respectively. Although the technology development is relatively successful, there is room for improvement in waste energy recovery.

Operating a steam methane reformer (SMR) using waste energy from a glass or steel reheating furnace has been discussed for a long time and the technology of fuel conversion using waste energy coupled with a SMR is commonly called Thermo-Chemical Recuperation (TCR). However, a challenge in combining an oxygen-fuel pre-heated furnace with a typical SMR is the temperature of available hot air generated from wasted flue gas is only about 680-700° C. at maximum, which is well below the temperature required to properly run a SMR that requires at least 800° C. The temperature of the waste flue gas from a glass furnace is generally about 1000° C. or above. However, the waste flue gas contains sulfuric acid which causes sulphate condensation in a low temperature portion of a flue gas channel. The waste flue gas also contains particulates that are harmful to the SMR. Thus, although the waste flue gas has thermal energy to run a SMR, if directly applying the waste flue gas from a glass furnace to operate the SMR, there will be problems of particulates presented in the entire flue gas channel and sulfuric acid and sulphate condensation in a low temperature portion of a flue gas channel.

Attempts to recycle waste energy applying TCR technology have been done. Chen et al. (EP0464603 B1) disclose the use of commercially pure oxygen in a glassmaking furnace with recovery of heat from the offgas by at least partially reforming furnace fuel, which offgas is predominately carbon dioxide due to the oxygen purity and which carbon dioxide can be recovered for recycle and for export as product.

Kapoor et al. (EP0643013 A1) disclose a hot exhaust gases (from oxygen-based hydrocarbon-fire) furnace made up predominantly of steam and carbon dioxide are used for reforming in a reformer a hydrocarbonaceous substance in the presence or absence of oxygen to produce carbon monoxide and hydrogen. Additional hydrogen can be produced by subjecting the carbon monoxide produced in the reaction to the water gas shift reaction.

Basu et al. (EP1071867 B1) disclose a portion of flue gas from burning a reformed fuel is directed to a gas turbine to produce power and the remaining flue gas mixed with hydrocarbon to produce reformed fuel which is burnt in a combustor.

Chudnovsky et al. (US2009/0011290 A1) disclose a two-stage heat exchange vessel. The first stage performs reforming using heat from the exhaust and the second recuperator is used to preheat oxidant for combustion.

Kweon et al. (U.S. Pat. No. 7,210,467) disclose an apparatus including a reciprocating internal combustion engine and a TCR in which a fuel is reformed. The TCR is heated by exhaust gases from the reciprocating internal combustion engine and steam for the reforming process is produced by passing feed water through an engine lubricating oil heat exchanger, an engine cooling system heat recovery system and an exhaust gas heat recovery system arranged in series.

These attempts to recover the waste energy by reforming or partially reforming the fuel gas have not shown any applications to systems that have no enough available energy to run a reforming process to fuel, for example, oxygen-fuel pre-heated combustion systems.

Thus, there remains a need to provide a solution for use of the waste energy and/or use of a hot air stream generated from the waste energy (e.g., flue gas) in the oxygen and fuel preheated combustion systems.

SUMMARY

There is disclosed a method for operating a glass furnace with a pre-reformer comprising the steps of feeding a non-pre-reformed hydrocarbon fuel gas stream to a pre-reformer forming a pre-reformed hydrocarbon fuel gas stream, feeding the pre-reformed hydrocarbon fuel gas stream to burners of the furnace, combusting oxidant and the pre-reformed hydrocarbon fuel gas with the burners to produce flue gas, heating air through heat exchange with the flue gas at a recuperator, and transferring heat from heated air to pre-reformer tubes of the pre-reformer.

There is also disclosed the steps of feeding an additional hydrocarbon fuel gas stream to the glass furnace and combusting the additional hydrocarbon fuel gas and the pre-reformed hydrocarbon fuel gas in the presence of the oxidant in the glass furnace and produce the flue gas therefrom.

There is also disclosed the percentage of the hydrocarbon fuel gas stream is x % of the sum of the hydrocarbon fuel gas stream and the additional pre-heated hydrocarbon fuel gas stream, where $0 < x \leq 100$.

There is also disclosed the hydrocarbon fuel gas and the additional hydrocarbon fuel gas are natural gas.

There is also disclosed the steps of desulfurizing the hydrocarbon fuel gas stream before pre-reforming and optionally desulfurizing the additional hydrocarbon fuel gas before feeding to the furnace.

There is also disclosed the steps of pre-heating the pre-reformed hydrocarbon fuel gas stream before feeding to the furnace and pre-heating the additional hydrocarbon fuel gas before feeding to the furnace.

There is also disclosed the temperature of the pre-reformed fuel gas is higher than that of the additional pre-heated hydrocarbon if the additional hydrocarbon fuel gas is pre-heated in a separate heat exchanger.

There is also disclosed the temperature of the additional pre-heated hydrocarbon fuel gas is below the coking temperature of the higher hydrocarbons contained in the hydrocarbon fuel gas.

There is also disclosed the step of pre-heating the oxidant before feeding it to the burners.

There is also disclosed the steps of drying the pre-reformed hydrocarbon fuel gas before feeding it to the burners.

There is also disclosed the step of the oxidant is oxygen or oxygen-enriched air.

There is also disclosed the pre-reformer is a non-adiabatic pre-reformer.

There is also disclosed the non-adiabatic pre-reformer is a heated-up pre-reformer wherein the pre-reformer is heated during pre-reforming process.

There is also disclosed the heated-up pre-reformer is a quasi-isothermal pre-reformer.

There is also disclosed the quasi-isothermal pre-reformer is a low pressure pre-reformer operated in a range of 1 to 5 bars.

There is also disclosed the quasi-isothermal pre-reformer is a low pressure pre-reformer operated in a range of 1 to 3 bars.

There is also disclosed the quasi-isothermal pre-reformer comprises a multiple stages of adiabatic pre-formers or a multiple tube reactors where pre-reformed reactants are re-heated using the heated air between the stages or reactors, thereby maintaining the temperature of the non-adiabatic pre-reformer unchanged or fluctuated in a preferred temperature range.

There is also disclosed the heated-up pre-reformer is a low pressure pre-reformer.

There is also disclosed a glass furnace system comprising a pre-reformer adapted and configured to receive a heated air stream and a feedstock of a hydrocarbon fuel gas stream in the presence of steam under conditions effective for pre-reforming higher hydrocarbons in the hydrocarbon fuel gas to CO and $H_2$ to produce a pre-reformed hydrocarbon fuel gas stream, a glass furnace including burners that are adapted and configured to combust oxidant and the pre-reformed hydrocarbon fuel gas to produce flue gas, and a recuperator adapted and configured to perform heat exchange between the flue gas and an air stream that has a temperature lower than that of a hot air stream, so as to produce the hot air stream received by the pre-reformer.

There is also disclosed a hydrodesulfurization system adapted and configured to desulfurize the hydrocarbon fuel gas, a dryer adapted and configured to remove water from the pre-reformed hydrocarbon fuel gas, a first heat exchanger adapted and configured to pre-heat the pre-reformed hydrocarbon fuel gas, and a second heat exchanger adapted and configured to pre-heat the oxidant.

There is also disclosed an additional feedstock of the hydrocarbon fuel gas fed to the glass furnace for use as fuel.

There is also disclosed the amount of the feedstock of the hydrocarbon fuel gas is x % of the sum of the feedstock of the hydrocarbon fuel gas and the additional feedstock of the hydrocarbon fuel gas, wherein $0<x\leq 100$.

There is also disclosed the hydrocarbon fuel gas and the additional feedstock of the hydrocarbon fuel gas are natural gas.

Any of the methods and system may include one or more of the following aspects:

feeding a non-pre-reformed hydrocarbon fuel gas stream to a pre-reformer forming a pre-reformed hydrocarbon fuel gas stream;

feeding the pre-reformed hydrocarbon fuel gas stream to burners of the furnace;

combusting oxidant and the pre-reformed hydrocarbon fuel gas with the burners to produce flue gas;

heating air through heat exchange with the flue gas at a recuperator;

transferring heat from heated air to pre-reformer tubes of the pre-reformer;

feeding an additional hydrocarbon fuel gas stream to the furnace;

combusting the oxidant, the additional hydrocarbon fuel gas and the pre-reformed hydrocarbon fuel gas in the furnace with the burners to produce the flue gas;

desulfurizing the hydrocarbon fuel gas stream before pre-reforming;

optionally desulfurizing the additional hydrocarbon fuel gas before feeding to the furnace;

pre-heating the pre-reformed hydrocarbon fuel gas stream before feeding to the furnace;

pre-heating the additional hydrocarbon fuel gas before feeding to the furnace;

the percentage of the hydrocarbon fuel gas stream is x % of the sum of the hydrocarbon fuel gas stream and the additional pre-heated hydrocarbon fuel gas stream, where $0<x\leq 100$;

the hydrocarbon fuel gas and the additional hydrocarbon fuel gas are natural gas;

the temperature of the pre-reformed fuel gas is higher than that of the additional pre-heated hydrocarbon if the additional hydrocarbon fuel gas is pre-heated in a separate heat exchanger;

the temperature of the additional pre-heated hydrocarbon fuel gas is below the coking temperature of the higher hydrocarbons contained in the hydrocarbon fuel gas;

pre-heating the oxidant before feeding it to the burners;

the oxidant is oxygen or oxygen-enriched air;

drying the pre-reformed hydrocarbon fuel gas before feeding it to the burners;

the pre-reformer is a non-adiabatic pre-reformer;

the non-adiabatic pre-reformer is a heated-up pre-reformer wherein the pre-reformer is heated during pre-reforming process;

the heated-up pre-reformer is a quasi-isothermal pre-reformer;

the heated-up pre-reformer is a low pressure pre-reformer;

the non-adiabatic pre-reformer is a quasi-isothermal pre-reformer;

the quasi-isothermal pre-reformer is a low pressure pre-reformer operated in a range of 1 to 5 bars;

the pre-reformer is a low pressure pre-reformer operated in a range of 1 to 3 bars;

the quasi-isothermal pre-reformer comprises a multiple stages of adiabatic pre-formers or a multiple tube reactors where pre-reformed reactants are re-heated using the heated air between the stages or reactors, thereby maintaining the temperature of the non-adiabatic pre-reformer unchanged or fluctuated in a preferred temperature range a pre-reformer adapted and configured to receive a heated air stream and a feedstock of a hydrocarbon fuel gas stream in the presence of steam under conditions effective for pre-reforming higher hydrocarbons in the hydrocarbon fuel gas to CO and $H_2$ to produce a pre-reformed hydrocarbon fuel gas stream;

a glass furnace including burners that are adapted and configured to combust oxidant and the pre-reformed hydrocarbon fuel gas to produce flue gas;

a recuperator adapted and configured to perform heat exchange between the flue gas and an air stream that has a temperature lower than that of a hot air stream, so as to produce the hot air stream received by the pre-reformer;

a hydrodesulfurization system adapted and configured to desulfurize the hydrocarbon fuel gas;

a dryer adapted and configured to remove water from the pre-reformed hydrocarbon fuel gas;

a first heat exchanger adapted and configured to pre-heat the pre-reformed hydrocarbon fuel gas;

a second heat exchanger adapted and configured to pre-heat the oxidant;

an additional feedstock of the hydrocarbon fuel gas fed to the glass furnace for use as fuel; and the feedstock of the hydrocarbon fuel gas and the additional feedstock of the hydrocarbon fuel gas are natural gas.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
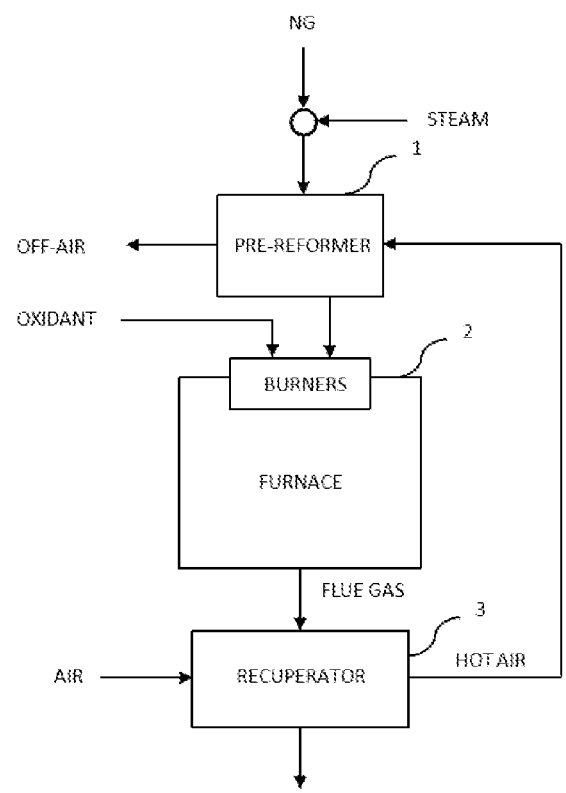
FIG. 1 is a block flow diagram of a system for maximizing combustion efficiency in a furnace of the present invention.

While the invention will be described in connection with several embodiments, it will be understood that it is not intended to limit the invention to those embodiments. On the contrary, it is intended to cover all the alternatives, modifications and equivalence as may be included within the spirit and scope of the invention defined by the appended claims.

The invention is a novel combination of a furnace whose burners receive feeds of oxidant and pre-reformed natural gas, a recuperator for exchanging heat between hot flue gas (from the furnace) and a stream of air, and a pre-reformer for pre-reforming natural gas containing methane and heavier hydrocarbons (i.e., $C_{2+}$ hydrocarbons). In this manner, two key advantages are produced.

First, by pre-reforming the natural gas that is fed as fuel gas to the burners of the furnace, a greater amount of thermal energy may be added to the fuel gas than is ordinarily achieved by conventional fuel pre-heating methods. This is because, for a same temperature to which the fuel gas is preheated, the pre-reformed natural gas (which inherently contains relatively lower amounts of heavier hydrocarbons) is less susceptible to coking than is non-pre-reformed natural gas (which inherently contains relatively higher amounts of heavier hydrocarbons). Coking of the heavier hydrocarbons causes fouling of the burner parts due to deposition of carbon. Thus, the useful life of the burner in performance of the invention is longer than in conventional fuel pre-heating methods for a given same temperature to which the fuel gas is heated. Since pre-reforming reaction is endothermic, the product has higher heating value than the original feed. Furthermore, due to the absence of the heavier hydrocarbons within the pre-reformed natural gas, the temperature of the fuel gas may rise above the coking temperature of the heavier hydrocarbons when the fuel gas is fed to the burners without the risk of coke formation.

Second, by using preheated air as a heat exchange fluid sufficient to supply the necessary heat for the pre-reformer, waste heat from the furnace (carried by flue gas) may be recovered and used in the pre-reformer. Those skilled in the art of combustion will recognize that using preheated air as a heat exchange fluid; there is no need to combust any fuel or use any other heat from the overall process for heating the non-pre-reformed fuel gas to the operating temperature of the pre-reformer.

Disclosed embodiments are systems and methods for enhancing waste heat recovery using a pre-reformer combined with oxygen and fuel preheating for combustion in an oxygen-fuel pre-heated furnace. The non-pre-reformed fuel gas is heated to the operating temperature of the pre-reformer by heat exchange with a hot air stream (about 680-700° C. at maximum) that is itself produced through heat exchange between flue gas from the furnace and a relatively colder (e.g., ambient) stream of air, thereby avoiding the problem of properly running a SMR with available hot air (about 680-700° C. at maximum) and the presence of particulates and sulfuric acid and sulphate condensation in a low temperature portion of the flue gas channel. The pre-reformer converts heavier or higher hydrocarbons in a fuel gas to methane and further convert some of methane to CO and $H_2$ in order to avoid carbon deposition in the furnace. The pre-reformer also increases the calorific heat content of the fuel gas thereby improving fuel economy, maximizing system efficiency and reducing emissions from the furnace. The available energy or heat from the furnace is ultimately carried by the preheated air, i.e., the hot air (produced through heat exchange between relatively colder air and the flue gas from the furnace), partially satisfies the endothermic heat requirements of the pre-reforming process. As such, the inventive combination (of the recuperator, pre-reformer, and furnace) becomes a unique approach in the field of waste energy recovery.

The hot air stream from the recuperator is fed to the pre-reformer and is used for providing the necessary heat requirements of the pre-reformer. When a feed stock of hydrocarbon fuel gas, such as a refinery off-gas or natural gas, is fed to the pre-reformer, heavier or higher hydrocarbons in the hydrocarbon fuel gas are broken down to light hydrocarbons, herein methane, and some of the methane is further broken down to CO and $H_2$, in the presence of steam to produce a pre-reformed fuel gas for use as fuel. The pre-reformed fuel gas includes hydrogen ($H_2$), carbon oxides (CO, $CO_2$), methane ($CH_4$) and steam ($H_2O$). Thus, the temperature of the product gas may be increased in the furnace without carbon deposition or coking caused by heavier or higher hydrocarbons.

The pre-reformer catalyst is specifically designed for converting heavier or higher hydrocarbons (i.e., $C_{2+}$ hydrocarbons) to methane, carbon oxides (CO, $CO_2$), and $H_2$. While some of the methane is converted to CO+$H_2$, the large majority is not since the nature of the catalyst preferentially catalyzes pre-reforming of the heavier hydrocarbons over pre-reforming of the methane. Since the content of heavier or higher hydrocarbons in refinery off-gas and natural gas has become higher recently, the pre-reformer becomes a solution to resolve this issue.

Optionally, a hydrodesulfurization unit (HDS) may be used upstream of the pre-reformer in order to remove sulfur from the hydrocarbon fuel gas.

A pre-reforming process is different from a reforming process.

In the pre-reformer, the higher hydrocarbons ($C_2^+$) in the hydrocarbons gas feedstock are converted by a steam reforming reaction to a mixture of hydrogen, carbon oxides and methane. As seen in the following reactions, steam reforming of higher hydrocarbons (I) is endothermic, which is followed by methanation reactions (II)

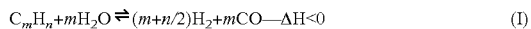
$$C_mH_n+mH_2O \rightleftharpoons (m+n/2)H_2+mCO-\Delta H<0 \qquad (I)$$

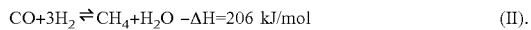
$$CO+3H_2 \rightleftharpoons CH_4+H_2O \ -\Delta H=206 \text{ kJ/mol} \qquad (II).$$

For a typical natural gas feed, the degree to which the overall pre-reforming process is either endothermic or exothermic depends upon the pressure and the heavier or higher hydrocarbons. For example, pre-reforming reactions for propane ($C_3H_8$) and butane ($C_4H_{10}$), the overall reaction is slightly endothermic at low pressure, and roughly thermoneutral at pressures of 280 psig or higher. Another example is pre-reforming reactions for a heavier feed of naphtha are overall exothermic.

Generally, the pre-reformer is operated at an inlet temperature ranging from 350-650° C. (preferably 400-500° C.), with a steam/carbon (S/C) ratio of 0.3 to 5 and with a pressure up to 70 bar (preferably 30-45 bar). Typically, the temperature of the pre-reformed fuel gas at an outlet of the pre-former is around 400-650° C. The catalyst utilized in pre-reformers typically has a relatively higher surface area and has a Ni content of around 25-50 wt %.

In contrast to pre-reformers, the main function of a reformer is to convert methane to syngas, not just heavier hydrocarbons. Methane steam reforming in a reformer is an endothermic reaction (III). Following conversion of the methane to $H_2$ and CO, the CO is converted to $H_2$ and $CO_2$ by the exothermic water-gas shift reaction (IV):

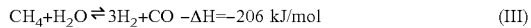
$$CH_4+H_2O \rightleftharpoons 3H_2+CO \ -\Delta H=-206 \text{ kJ/mol} \qquad (III)$$

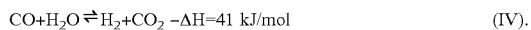
$$CO+H_2O \rightleftharpoons H_2+CO_2 \ -\Delta H=41 \text{ kJ/mol} \qquad (IV).$$

Generally, the reformer is operated at an inlet temperature ranging from 400-600° C., uses a S/C ratio of 2 to 5, and is operated at a pressure up to 70 bar (typically 30-45 bar) where a temperature of the reformed fuel gas at an outlet of the reformer is significantly high, i.e., around 880° C. or higher. The catalyst utilized in reformers typically has a relatively lower surface area and has a significantly lower Ni content of around 15 wt %.

Figure 6:
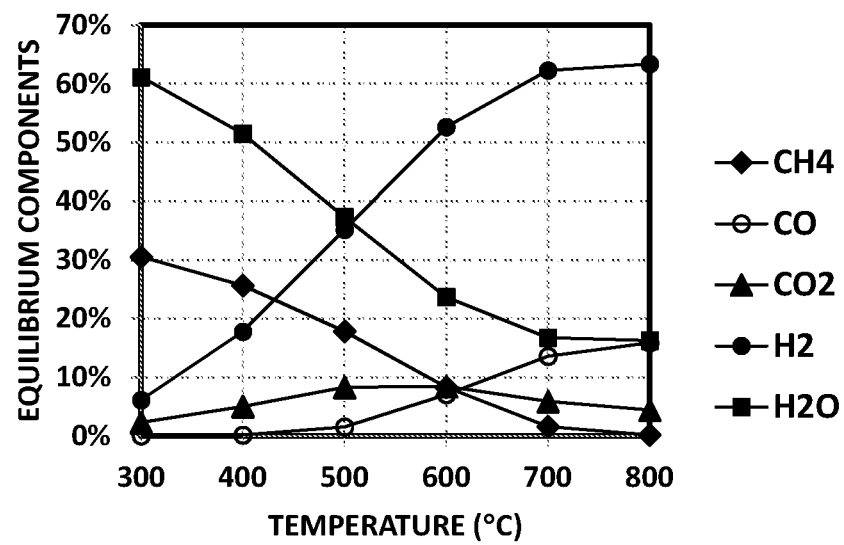
FIG. 6 is a graph of calculated equilibrium compositions versus temperature for a pre-reformer and reformer.

Furthermore, equilibrium compositions at the outlet of the reactors for pre-reforming and reforming are different. FIG. 6 is a graph of the equilibrium compositions versus temperature for a pre-reformer and reformer calculated for 90/10 methane/ethane with steam (S/C=2) at 1 bar pressure. As shown, $CH_4$ still exists in the temperature range of pre-reforming operation (e.g., 400-650° C.). In contrast, the $CH_4$ content of syngas from a reforming operation at high temperatures of a reformer (e.g., above 750° C.) is far, far lower than those at the temperatures below 700° C. When a pre-reformer is followed by a reformer, because the heavier or higher hydrocarbons are converted to $CH_4$, $H_2$, CO and $CO_2$ prior to being fed to the reformer, the risk of coke formation in the reformer is ameliorated or even eliminated and the product gas may be safely heated up to 650° C. or higher.

Now that the differences between pre-reformers and reformers have been explained, we now continue with a description of the invention and disclosed embodiments.

The pre-reformer used in the processes of the disclosed embodiments may be an adiabatic pre-reformer, or a non-adiabatic pre-reformer, such as a heated up pre-reformer or a low pressure pre-reformer. The adiabatic pre-reformers may include an insulated vessel filled with a pre-reforming catalyst and commercially available. The heated up pre-reformer means the pre-reformer is heated during pre-reforming process. The heated up pre-reformer may be a quasi-isothermal pre-reformer that is operated at a minimized pressure (i.e., low pressure), preferably several bars, more preferably around 1 to 3 bars, with the following situations in mind. The pressure of the non-preformed fuel gas fed to the pre-reformer should not be too low due. Otherwise, it may not be high enough to overcome the pressure drop of the pre-reformer. Also, if the pressure is too low, the size of a reactor will need to be increased and may become unsatisfactorily large, thereby increasing capital costs by an unsatisfactory amount. In practice, the quasi-isothermal pre-reformer may be composed of i) a multiple stages of adiabatic pre-formers where the reactants (i.e., the partially pre-reformed fuel gas) are re-heated using the hot air between the stages, or ii) a multiple tube reactors heated by the hot air, to mimic isothermal operation. The heated-up pre-reformer or quasi-isothermal pre-reformer are heated using available heat (e.g., waste flue gas or hot air) during pre-reforming process. Specifically, the quasi-isothermal pre-reformer is operated by heating the pre-reforming reactants in between the stages to maintain the temperature of the pre-reformer unchanged or fluctuated in a preferred temperature range.

Figure 7:
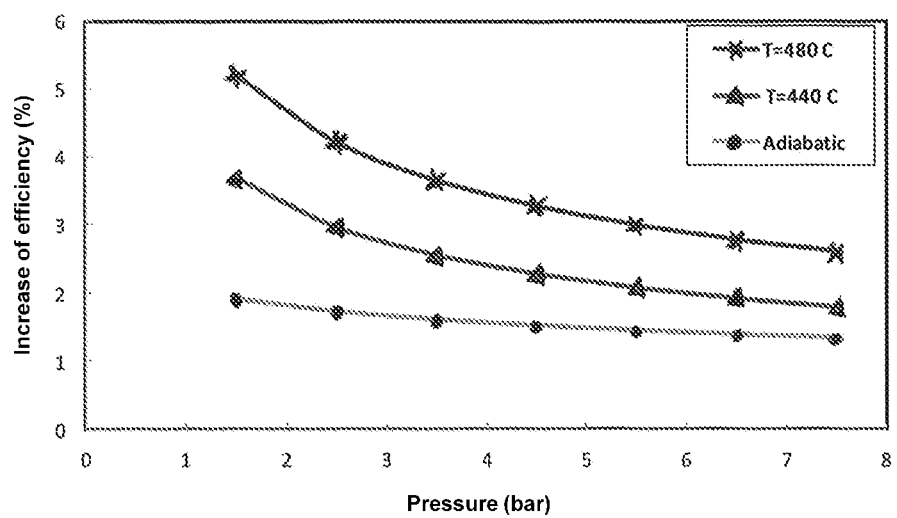
FIG. 7 is a graph of increase of efficiency versus pressure for a pre-reformer calculated for 90/10 methane/ethane with steam (S/C=2) at different temperatures.

Low pressures (e.g., about 1 to 5 bars) with a proper steam/carbon ratio (S/C) is more beneficial to increase lower heating value (LHV) of pre-reformed fuel gas under all conditions than high pressures (e.g., above 5 bars). FIG. 7 is a graph of increase of efficiency versus pressure for a pre-reformer calculated for 90/10 methane/ethane with steam (S/C=2) at different temperatures. As shown, low pressure is beneficial to the efficiency, that is, the heavier or higher hydrocarbons are broken down to methane, and some amount of methane may be further converted to CO and $H_2$ resulting in an increased LHV, thereby increasing the combustion efficiency. FIG. 7 also shows that increasing temperature is in favor of the efficiency. At a lower pressure or a pressure a slightly higher than ambient pressure, the heavier or higher hydrocarbons are broken down to methane in a pre-reformer, and some amount of methane may be further converted in the pre-reformer to CO and $H_2$ resulting in an increase of the energy content or calorific heat of the fuel gas, thereby increasing the combustion efficiency. Thus, a low-pressure pre-reformer is applied herein to pre-reform the fuel gas. In certain embodiments, a low-pressure pre-reformer may only be used in the fuel gas stream since the fuels gas is combusted in the combustion chamber at ambient pressure, whereas the process gas is sent to the reformer tubes at higher pressures (e.g., 30 to 40 bar).

Furthermore, steam/carbon (S/C) ratio may be maximized as long as available waste energy is enough for running the system with the pre-reformer. Here, it is known that higher S/C ratio leads to higher efficiency gain of combustion. However, increasing S/C leads to higher operating energy due to energy loss through latent heat (e.g., heat for producing steam or water vapor from water). In addition, the pre-reformer may be operated at isothermal or close to isothermal conditions (i.e., quasi-isothermal) to maintain the temperature of the pre-reformer high. As shown in FIG. 7, increasing the temperature is in favor of the efficiency. For example, the increase of efficiency at T=480° C. is higher than that at T=440° C. in a low pressure range. As described above, by employing i) multiple stages of pre-reformers where the reactants (i.e., the partially pre-reformed fuel gas) are reheated between the stages and ii) multiple tube reactors heated by hot air, the pre-reformer may be operated as close as an isothermal reactor.

Other types of useful pre-reformers well-known to those of ordinary skill in the art may also be used in the embodiments of the present invention.

FIG. 1 is a block flow diagram of a system for maximizing combustion efficiency in a furnace of the present invention. In this embodiment, the system generates a pre-reformed fuel gas stream for use as fuel. More specifically, the system includes pre-reformer 1, furnace 2 and recuperator 3. Here, a non-pre-reformed hydrocarbon fuel gas stream for use as fuel, such as a natural gas stream, is fed to pre-reformer 1 where, in the presence of steam and under conditions effective for pre-reforming the natural gas fuel, heavier or higher hydrocarbons in the natural gas are converted into $CH_4$, $H_2$, CO, $CO_2$, and $H_2O$, to produce a pre-reformed fuel gas for use as fuel for furnace 2. Thus, the amount of methane within the non-pre-reformed fuel gas is increased and carbon deposition on burner parts of furnace 2 is avoided. The temperature of the non-pre-reformed hydrocarbon fuel gas may be at ambient temperature or may be pre-heated. "Furnace" used herein may be a natural gas fired glass furnace, and operate at temperatures up to 1,500° C. to 1650° C. The temperature of the furnace may be limited only by the quality of the furnace's superstructure material and by the glass composition.

By removing higher hydrocarbons, the temperature of the pre-reformed fuel gas stream may be raised (in comparison to the temperature of the non-pre-reformed fuel gas) without coking in furnace 2. The pre-reformed fuel gas stream is introduced into burners of furnace 2 where the burners combust the pre-reformed fuel gas with an oxidant in a combustion zone of furnace 2 to provide heat for melting glass in furnace 2, and to produce a hot flue gas downstream of furnace 2. Here the oxidant may be air, industrially pure oxygen or oxygen-enriched gas having an oxygen concentration higher than that of air.

The flue gas is then fed to recuperator 3 where an air stream is heated through heat exchange with the flue gas to form a hot air stream. The air stream fed to the recuperator may be at ambient temperature, such as about 15° C., before being forwarded to recuperator 3. Alternatively, the air stream fed to recuperator 3 may be at a temperature higher than ambient but less than that of the hot flue gas. Those skilled in the art of heat recovery methods in combustion will recognize that recuperator 3 may be an air/flue gas recuperator that may be a counter-flow energy recovery heat exchanger.

The hot air stream produced by recuperator 3 is fed to pre-reformer 1 where heat from the hot air stream is transferred to pre-reformer tubes of pre-reformer 1 thereby providing heat for the pre-reforming reaction carried out in pre-reformer 1, as described above.

The flue gas downstream of furnace 2 typically may have a temperature of around 1100° C. to 1300° C. Thus, the temperature of the hot air downstream of recuperator 3 may be able to reach temperatures as high as 1000° C., preferably above 650° C., which is enough for running pre-reformer 1. Here, the hot air downstream (i.e., off-air) of pre-reformer 1 is cooled and may optionally be recycled to recuperator 3 as the relatively colder air. In this way, the air stream forms a loop in which the air is heated in recuperator 3 and cooled after pre-reformer 1. Regardless of whether the air is recycled or not, in this embodiment, a feedstock of the hydrocarbon fuel gas is pre-reformed and combusted for providing heat for melting glass.

Herein, pre-reformer 1 may be an adiabatic pre-reformers which may include an insulated vessel filled with a pre-reforming catalyst, or a non-adiabatic pre-reformer, such as a heated up pre-reformer or a quasi-isothermal pre-reformer, as described above. Here, to our knowledge, operating a pre-reformer at a quasi-isothermal condition or as close as possible to isothermal condition offers the possibility of significant fuel cost reduction and higher system combustion efficiencies comparing to the conventional furnaces. Pre-reformer 1 may be a low pressure pre-reformer operated at a low pressure of about 1 to 5 bar, preferably, 1 to 3 bars. At such a lower pressure, the heavier hydrocarbons are converted to methane and some amount of methane may be further converted CO and $H_2$ resulting in an increase of the energy content or calorific heat of the fuel gas, thereby increasing the combustion efficiency.

Considering a pre-reformer catalyst may have a life time of several years, a spare pre-reformer may be installed in parallel with the existing pre-reformer 1. When the catalyst of the existing one needs to be replaced, the spare one may instead be used for continuous operation of the system.

Furnace 2 used herein may be a glass furnace that is natural gas fired, and operate at temperatures up to 1,575° C. The temperature is limited only by the quality of the furnace's superstructure material and by the glass composition.

Figure 2A:
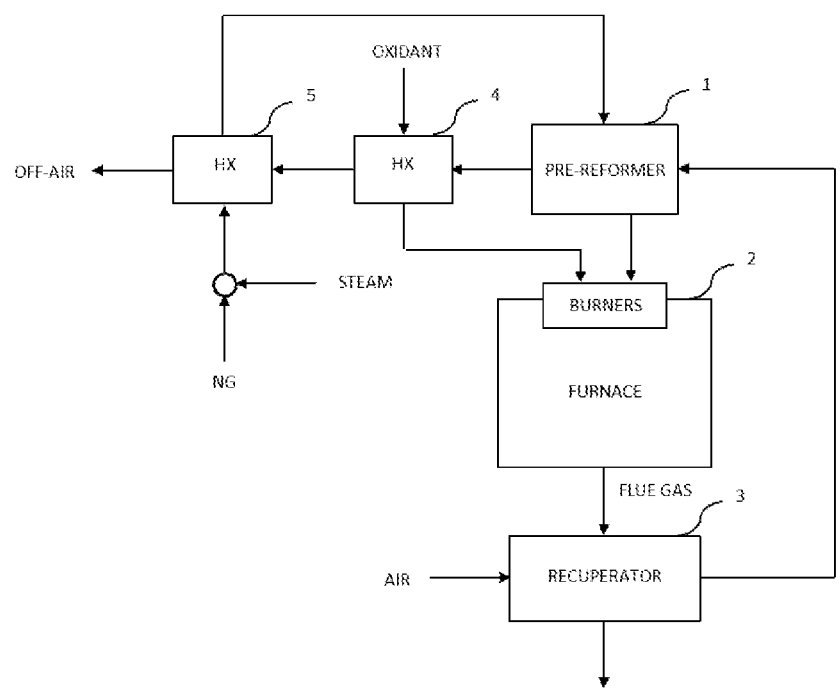
FIG. 2A is a block flow diagram of an embodiment of the system shown in FIG. 1.

In another embodiment and as best shown in FIG. 2A, the oxidant and the non-pre-reformed feedstock are pre-heated. FIG. 2A is a block flow diagram of a variant of the system shown in FIG. 1. Heat exchanger (HX) 4 and HX 5 are used for pre-heating oxidant and a feed stock of non-pre-reformed natural gas fuel stream, respectively. Here, the hot air downstream of pre-reformer 1 is fed to HX 4 for pre-heating the oxidant to produce a pre-heated oxidant stream sent to the burners of furnace 2. The hot air downstream of HX 4 is forwarded to HX 5 for pre-heating the natural gas fuel stream to produce a pre-heated non-pre-reformed natural gas. The locations of HX 4 and HX 5 may be altered, that is, the hot air downstream of pre-reformer 1 is fed to HX 5 first, and then the hot air downstream of HX 5 is forwarded to HX 4. Similarly, an off-air downstream of HX 5 may be optionally sent back to recuperator 3 to form an air loop.

Figure 2B:
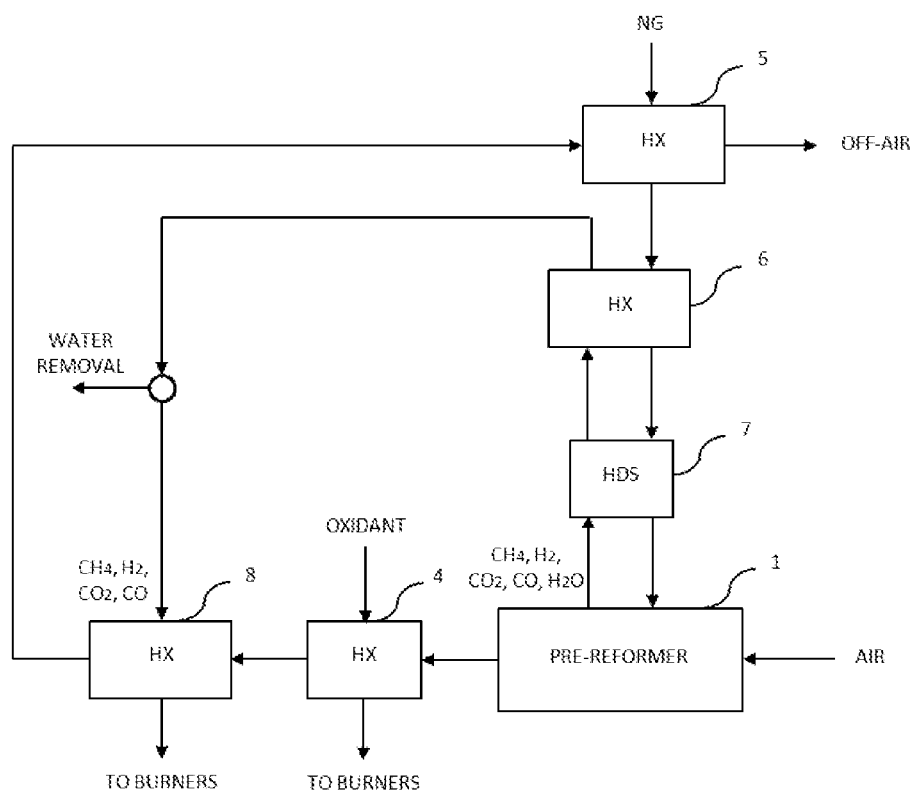
FIG. 2B is a block flow diagram of another embodiment of the system shown in FIG. 1.

In another variant of the system of FIG. 1 and as best shown in FIG. 2B, the pre-reformed natural gas may first be desulfurized in a hydrodesulfurization (HDS) unit and pre-heated by a heat exchanger before being fed to furnace 2. As shown, HX 6, HDS 7 and HX 8 are included in the system. The natural gas stream in the presence of steam (not shown) is pre-heated by HX 5 and HX 6 and then fed to HDS 7 to remove sulfur in the natural gas stream in order to avoid poisoning of the pre-reformer catalyst and to eliminate sulfuric acid condensation. The HDS used in the processes of the disclosed embodiments may be any HDS unit well-known to those of ordinary skill in the art for removing sulfur from hydrocarbons.

Subsequently, the desulfurized non-pre-reformed hydrocarbon fuel gas is fed to pre-reformer 1 in the presence of steam (not shown) under conditions effective for pre-reforming the desulfurized mixture of the natural gas to produce a pre-reformed fuel gas stream including $CH_4$, $H_2$, CO, $CO_2$, and $H_2O$. The pre-reformed fuel gas stream is sent back to HDS 7 for heat exchange with the non-pre-reformed natural gas fed to HDS 7. Downstream of HDS 7, the pre-reformed fuel gas is forwarded to HX 6 for heating the non-desulfurized non-pre-reformed fuel gas at HX 6.

Since the pre-reformed fuel gas contains $H_2O$ that is not favored by a combustion furnace, the pre-reformed fuel gas is then dried to remove water in a dryer (not shown) producing a dry pre-reformed fuel gas stream. The dryer may use a heat exchanger to cool a pre-reformed fuel gas stream containing steam down to a temperature below the dew point of water, thereby separating the water. The dry pre-reformed fuel gas stream is then pre-heated in HX 8 (through heat exchange with the hot air stream) forming a pre-heated dry pre-reformed fuel gas stream. The pre-heated dry pre-reformed fuel gas stream is fed to the burners of furnace 2 for use as fuel. Oxidant is preheated at heat exchanger HX 4 through heat exchange with the hot air stream. The burners combust the pre-heated dry pre-reformed fuel gas in the presence of the pre-heated oxidant to provide heat for melting glass (not shown) in furnace 2 and produce a flue gas there from.

In this embodiment, the hot air generated by heat exchanging of the air stream with the flue gas stream in recuperator 3 is used as heat source for running pre-reformer 1 and other heat exchangers such as HX 4, HX 5 and HX 8. The hot air downstream of HX 5 is cooled and may optionally be sent back to recuperator 3 for use as the air input to recuperator 3, thereby forming an air loop. In this embodiment, a feedstock of the hydrocarbon fuel gas is pre-reformed in the presence of the steam in which a proper steam/carbon (S/C) ratio is determined.

The heat exchangers used in the processes of the disclosed embodiments may include different stages of heat exchangers for heating oxygen, water, natural gas and pre-reformed natural gas and other heat exchangers used in the disclosed embodiments specifically in a flue gas channel. The heat exchangers preferably employ heating elements, e.g., plate, pipes or coils, which reheat the corresponding gas stream at a substantially constant reheat temperature, achieving a uniform reheat temperature that minimizes carbon deposition in the corresponding gas stream. Suitable heat exchangers may be any commercially available heat exchangers used in SMR or in the glass industry or those well-known to those skilled in the art of SMRs or glass furnaces.

Figure 3A:
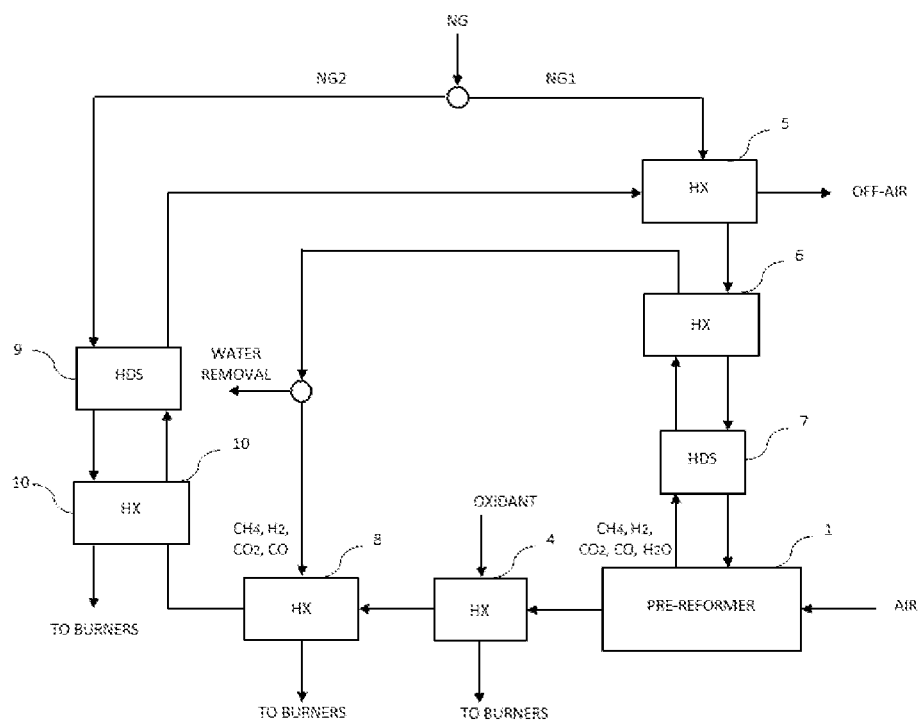
FIG. 3A is a block flow diagram of an embodiment of a desulfurized oxygen and fuel preheated system with partial pre-reforming for maximizing combustion efficiency in a furnace of the present invention.

When the available hot air heat or thermal contents in the system is not enough to pre-reform a feedstock of the hydrocarbon fuel gas, partially pre-reforming the feedstock of the hydrocarbon fuel gas may be an option. An alternative embodiment of a process for enhancing waste energy recovery in an oxygen-fuel pre-heated furnace of the present invention is schematically illustrated in FIG. 3A. In this embodiment, a feedstock of hydrocarbon fuel gas is partially pre-reformed. As shown, the feedstock of a non-pre-reformed hydrocarbon fuel gas, such as natural gas (NG), is split into two streams, a first fuel stream (NG1) and a second fuel stream (NG2). The NG1 may have x % of the total amount of the feedstock of the natural gas; the NG2 may have (1−x) % of the total amount of the feedstock of the natural gas. Here $0<x\leq100$. For example, x may be 40, 50, 60, etc. Preferably, x=50, which means 50% of the total amount of the feedstock of the natural gas is pre-reformed and 50% of the natural gas is not pre-reformed.

More specifically, the NG1 (i.e., x %) stream is pre-heated by HX 5 and HX 6 and desulfurized by HDS 7 and then pre-reformed in pre-reformer 1 in the presence of steam (not shown) to convert higher hydrocarbons in the NG1 to methane, CO and $H_2$, thereby producing a pre-reformed fuel gas that contains $CH_4$, $H_2$, CO, $CO_2$, and $H_2O$. As a result of partially pre-reforming the NG1 in pre-reformer 1, a higher calorific heat content fuel (e.g., CO and $H_2$) may be expected. After removing water, the pre-reformed NG1 fuel gas is pre-heated in HX 8 by heat exchanging with the hot air downstream of HX 4 for pre-heating the oxidant forming a preheated dry pre-reformed NG1 fuel gas stream and then the preheated dry pre-reformed NG1 fuel gas stream is forwarded to the burners of furnace 2 for use as fuel.

While the NG1 stream is undergone the pre-reforming process, the NG2 stream (i.e., (1−x) %) is desulfurized in HDS 9 and pre-heated in HX 10 forming a desulfurized pre-heated NG2 fuel gas stream. The desulfurized preheated NG2 fuel gas stream is then fed to the burners of furnace 2 directly for use as fuel. The burners of furnace 2 combust the preheated dry pre-reformed NG1 fuel gas and the desulfurized preheated NG2 fuel gas in the presence of a pre-heated oxidant stream pre-heated by HX 4, providing heat for melting glass (not shown) in furnace 2 and producing a flue gas therein. Here the pre-heated oxidant is produced by heat exchanging with the hot air downstream of pre-reformer 1. Alternatively, the oxidant may be pre-heated by heat exchanging with the hot air downstream of HX 8 and the dry pre-reformed NG1 fuel gas may be pre-heated by heat exchanging with the hot air downstream of pre-reformer 1.

In this embodiment, the dry pre-formed NG1 fuel gas stream and the desulfurized NG2 fuel gas stream may be pre-heated to different temperatures by HX 8 and HX 10, respectively, before combined together in the burners of furnace 2. For example, the temperature of the pre-heated dry pre-formed NG1 fuel gas stream may be higher than the temperature of the pre-heated desulfurized NG2 fuel gas stream, because higher hydrocarbons in the NG1 stream is converted to CO and $H_2$ by pre-reformer 1, and the temperature of the pre-heated dry pre-formed NG1 fuel gas stream may be pre-heated to a temperature above the cocking temperature of hydrocarbons, e.g., 450° C., whereas the temperature of the pre-heated desulfurized NG2 fuel gas stream has to be maintained below the cocking temperature of hydrocarbons after before feeding to furnace 2 in order to avoid carbon deposition or coking in furnace 2. Thus, the temperature of the pre-heated desulfurized NG2 fuel gas stream may be maintained above the cocking temperature of hydrocarbons. Since the NG2 stream does not undergo pre-reforming, the system may have enough energy or heat to run pre-reformer 2.

Figure 3B:
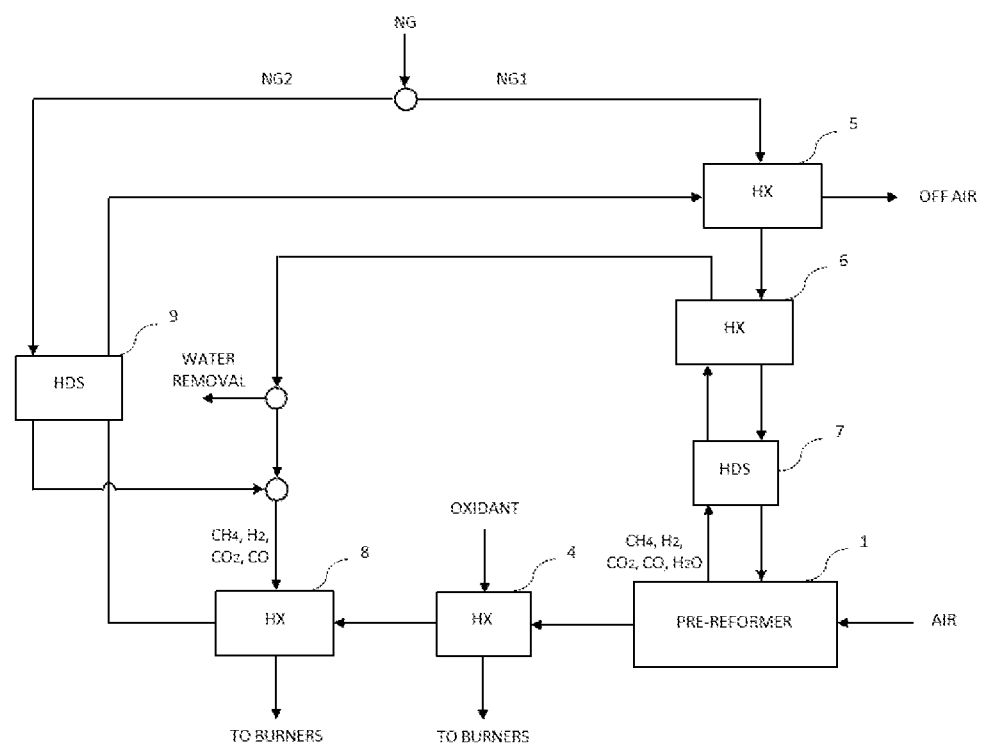
FIG. 3B is a block flow diagram of another embodiment of a desulfurized oxygen and fuel preheated system with partial pre-reforming for maximizing combustion efficiency in a furnace of the present invention.

Alternatively, the pre-heated dry pre-formed NG1 fuel gas and the pre-heated desulfurized NG2 fuel gas may have the same temperature before feeding to the burners in order to simplify the system, as shown in FIG. 3B. In this embodiment, a feedstock of a hydrocarbon fuel gas, such as natural gas, is also partially pre-reformed. The difference between the embodiments of FIG. 3A and FIG. 3B is in FIG. 3B the pre-heated dry pre-formed NG1 fuel gas and the pre-heated desulfurized NG2 fuel gas are pre-heated together by HX 8 instead of pre-heating separately. As shown, after desulfurizing by HDS 9, the desulfurized NG2 fuel gas stream is merged with the dry pre-reformed NG1 fuel gas stream and then sent to HX 8 together where both the pre-heated dry pre-formed NG1 fuel gas and the desulfurized NG2 fuel gas are pre-heated by HX 8.

Accordingly, in this embodiment, the pre-heated dry pre-formed NG1 fuel gas stream and the desulfurized NG2 fuel gas stream have the same temperature after pre-heating by HX 8. Although the pre-heated dry pre-formed NG1 fuel gas stream is pre-reformed to convert higher hydrocarbons in the NG1 fuel stream to CO and $H_2$, the temperature of the pre-heated dry pre-formed NG1 fuel gas stream has to maintain below the coking temperature of hydrocarbons because the higher hydrocarbons within the desulfurized NG2 fuel gas stream are not cracked and the temperature of the desulfurized NG2 fuel gas stream has to be maintained below the coking temperature of the hydrocarbons. In this embodiment, since the NG2 fuel gas stream does not pre-reformed that saves energy, the system may have enough energy or heat to run pre-reformer 1.

Figure 4:
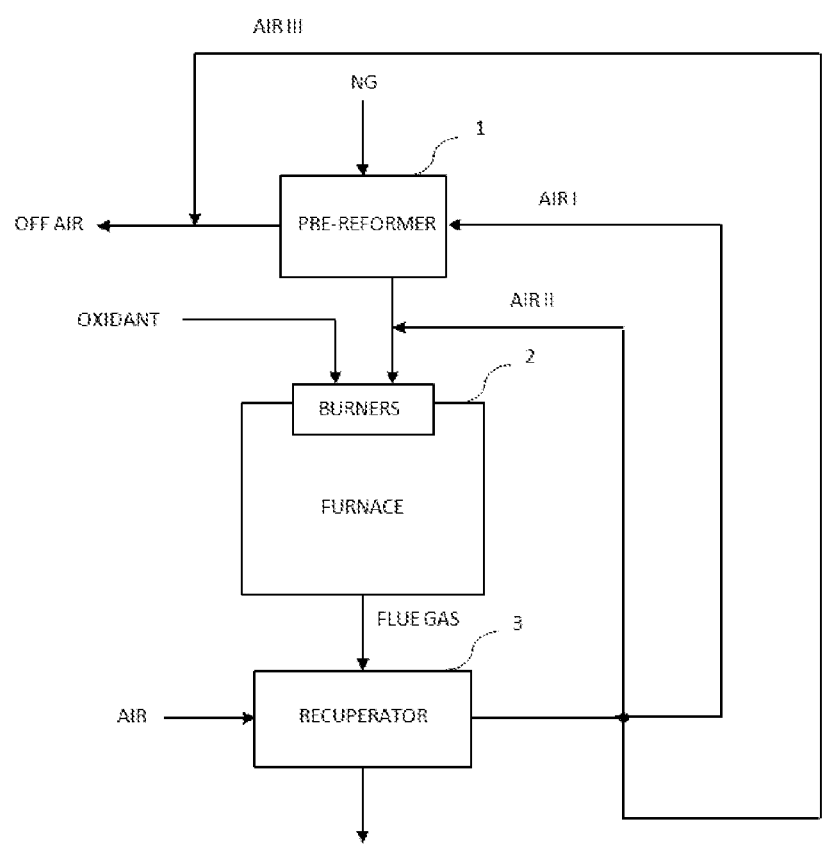
FIG. 4 is a block flow diagram of an alternative system for maximizing combustion efficiency in a furnace of the present invention.

In the above disclosed embodiments, off-air may optionally be recycled to the recuperator as the relatively colder air, air stream forms an air loop for use as a primary heat carrier to operate the pre-reformer and the corresponding heat exchangers and HDSs. Alternatively, the air stream may form an air channel that takes a tree structure form where the pre-reformer and the heat exchanger for pre-heating a pre-reformed fuel gas are in the first level of the air channel and all other heat exchangers and HDSs are in the second level of the air channel, as shown in FIG. 4. In this embodiment, a hot air downstream of recuperator 3 is split into three portions, AIR I, AIR II and AIR III. The AIR I is fed to pre-reformer 1 for running pre-reformer 1; AIR II is fed to a heat exchanger (not shown) for use as heat source to pre-heat a pre-reformed natural gas downstream of pre-reformer 1; AIR III is added to the hot air downstream of pre-reformer 1 to provide more heat to the hot air downstream of pre-reformer 1 for use as heat source for running corresponding HXs and HDSs. The hot air downstream of recuperator 3 may be split evenly or not evenly depending on the thermal content requirements of the components in the system. For example, the hot air stream used for operating a pre-reformer may have more hot air flow than the other two hot air streams since the pre-reformer should be maintained under conditions effective for pre-reforming the natural gas.

Figure 5A:
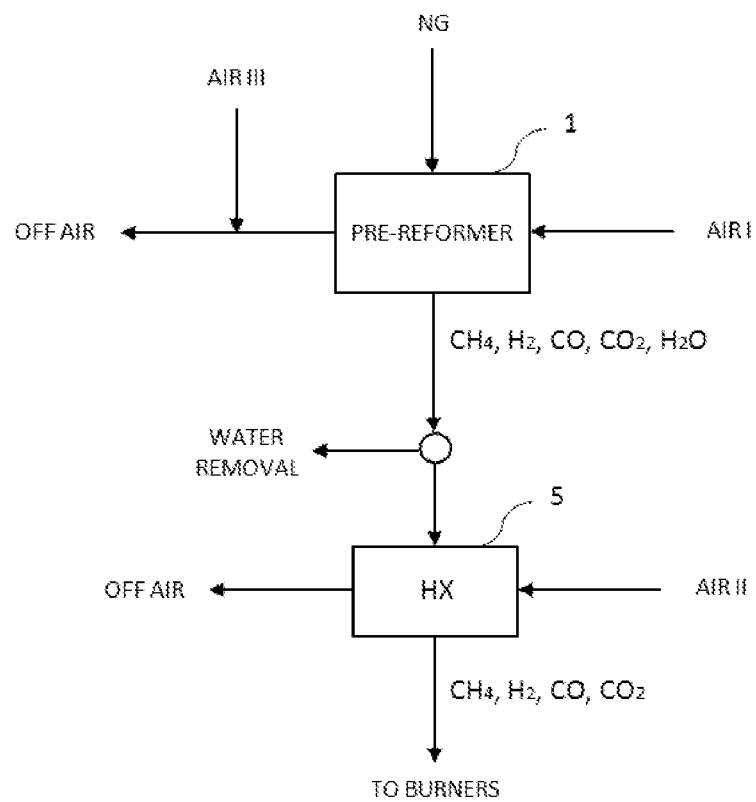
FIG. 5A is a block flow diagram of a fuel preheated system for maximizing combustion efficiency in a furnace of the present invention.

In one embodiment shown in FIG. 5A, AIR I is fed to pre-reformer 1 where heavier or higher hydrocarbons in the natural gas are broken down into light hydrocarbons, herein methane, and further the methane is broken down to CO and $H_2$, in the presence of steam (not shown) under conditions effective for pre-reforming the natural gas fuel to produce a pre-reformed fuel gas for use as fuel for furnace 2 including $CH_4$, $H_2$, CO, $CO_2$, and $H_2O$. The pre-reformed fuel gas stream is then pre-heated by HX 5 through heat exchanging with AIR II and fed to the burners of furnace 2 for use as fuel after drying.

Figure 5B:
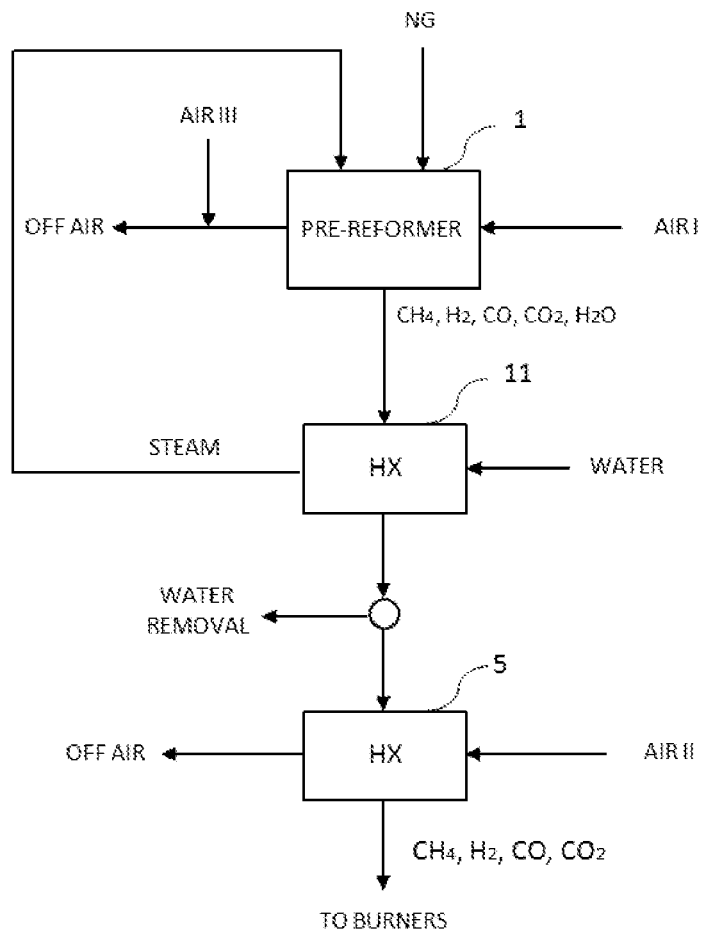
FIG. 5B is a block flow diagram of an alternative fuel preheated system for maximizing combustion efficiency in a furnace of the present invention.

In one embodiment, before drying, the pre-reformed fuel gas may be used as a heat source to generate steam by HX 11 for feeding to pre-reformer 1 as shown in FIG. 5B.

Figure 5C:
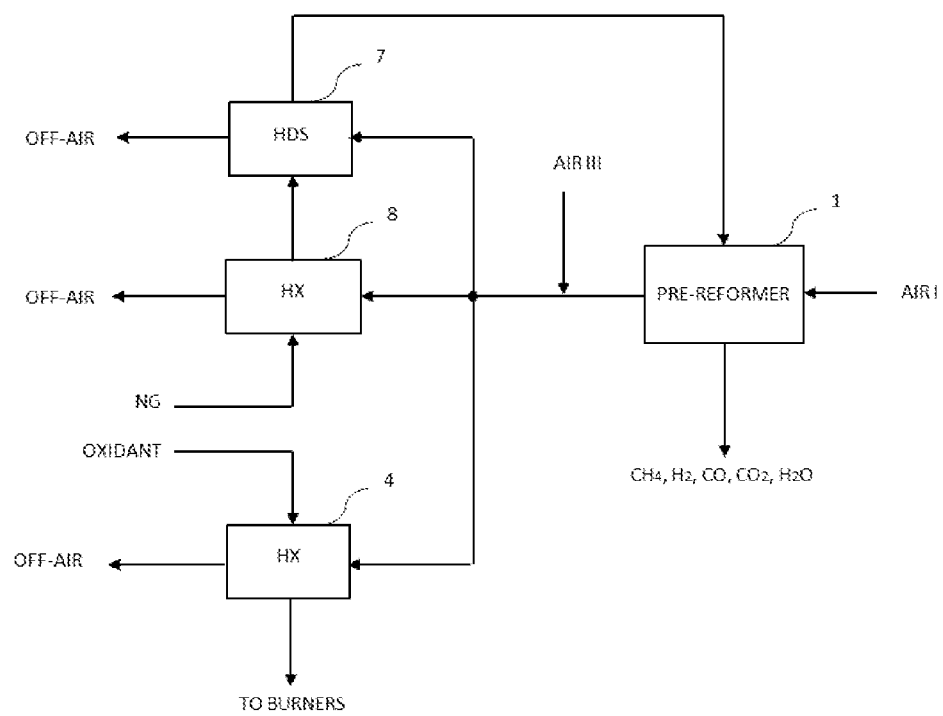
FIG. 5C is a block flow diagram of an alternative oxygen and fuel preheated system for maximizing combustion efficiency in a furnace of the present invention.

In another embodiment, the hot air downstream of pre-reformer 1 combining with AIR III is split into three portions. One portion is used for pre-heating the oxidant by HX 4 before feeding to the burners of furnace 2. The other two portions are used for heating and desulfurizing the natural gas fuel by HX 8 and HDS 7, respectively, as shown in FIG. 5C. In this embodiment, a feedstock of the hydrocarbon fuel gas is pre-reformed in the presence of the steam (not shown) in which a proper steam/carbon (S/C) ratio is determined.

Figure 5D:
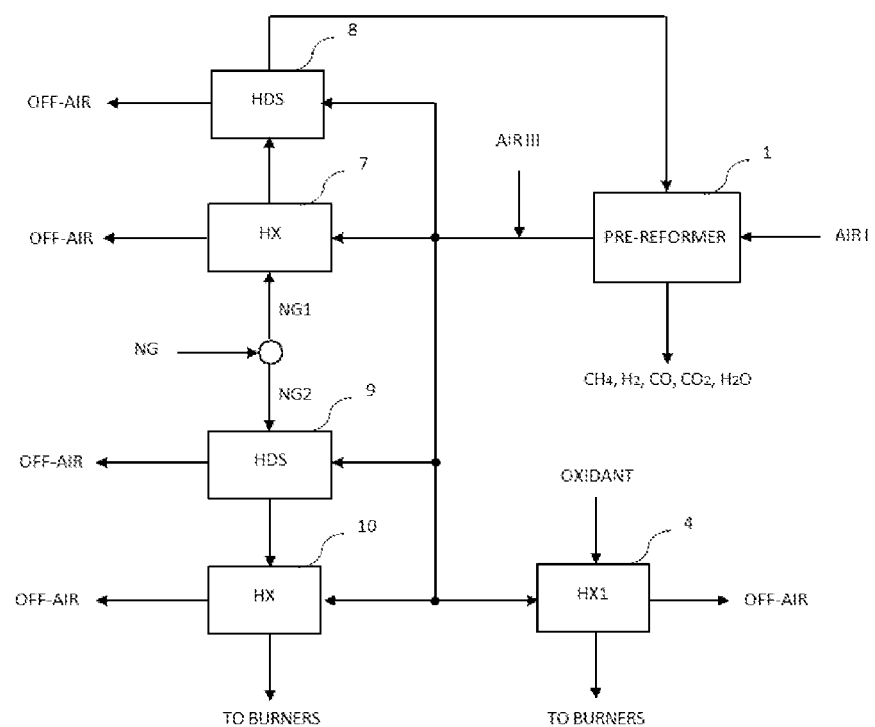
FIG. 5D is a block flow diagram of alternative oxygen and fuel preheated system with partial pre-reforming for maximizing combustion efficiency in a furnace of the present invention.

Similarly, when the available flue gas heat or energy contents in the system is not enough to pre-reform a total feedstock of the hydrocarbon fuel gas, partially pre-reforming the feedstock of the hydrocarbon fuel gas may be an option, as shown in FIG. 5D. In this embodiment, a feedstock of hydrocarbon fuel gas is partially pre-reformed. The feedstock of a hydrocarbon fuel gas, such as natural gas (NG), is split into two streams, a first fuel stream (NG1) and a second fuel stream (NG2). The NG1 may have x % of the total amount of the natural gas; the NG2 may have (1−x) % of the total amount of the natural gas. Here 0<x≤100. For example, x may be 40, 50, 60, etc. Preferably, x=50, which means 50% of the total amount of the natural gas is pre-reformed and 50% of the natural gas is not pre-reformed.

More specifically, the hot air downstream of pre-reformer 1 combining with AIR III is split into five portions. One portion is used for pre-heating the oxidant by HX 4 before feeding to the burners. Two portions are used for heating and desulfurizing the NG1 (e.g., x %) stream is desulfurized by HX 7 and pre-heated by HDS 8 and then pre-reformed by pre-reformer 1 in the presence of steam (not shown) to convert higher hydrocarbons in the NG1 to CO and $H_2$, thereby producing a pre-reformed fuel gas that contains $CH_4$, $H_2$, CO, $CO_2$, and $H_2O$. As a result of partially pre-reforming the NG1 in pre-reformer 1, higher calorific heat content fuel (e.g., CO and $H_2$) may be expected. The other two portions are used for pre-heating and desulfurizing the NG2 stream by HDS 9 and HX 10 before feeding to the burners. Since the NG2 is not pre-reformed, the temperature of the NG2 before feeding to the burners has to maintain below the temperature of coking temperature of higher hydrocarbons to avoid coking in the furnace.

Figure 5E:
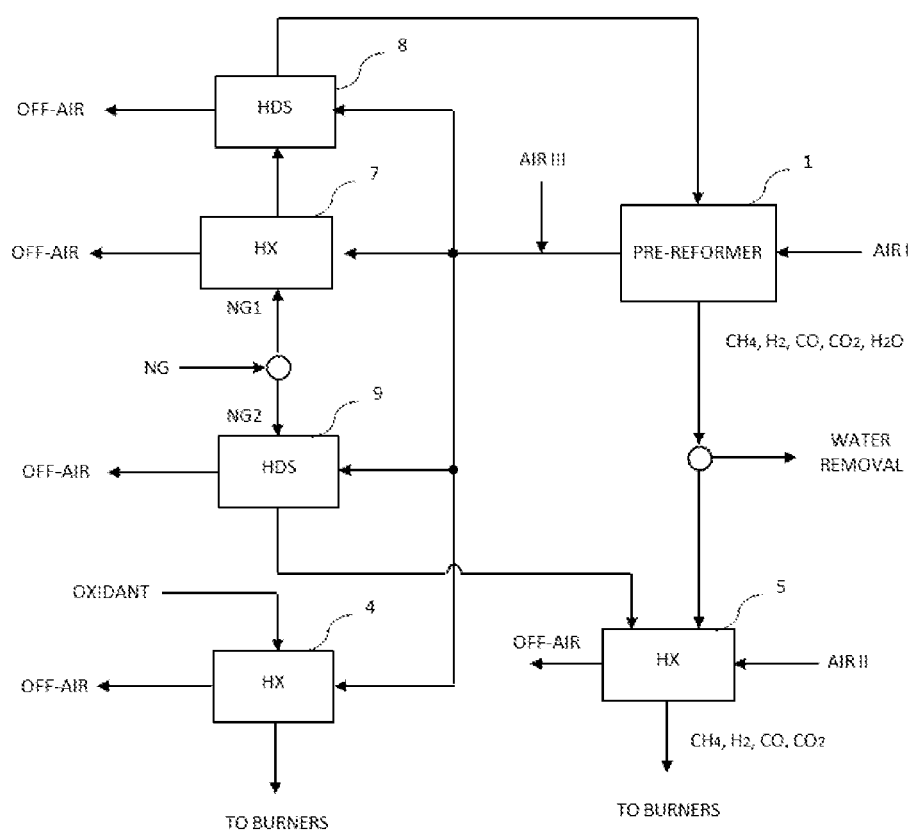
FIG. 5E is a block flow diagram of another alternative oxygen and fuel preheated system with partial pre-reforming for maximizing combustion efficiency in a furnace of the present invention.

In an alternative embodiment, the system may exclude HX 10, instead, pre-heating the NG2 stream with the pre-reformed NG1 together by HX 5, as shown in FIG. 5E. In this embodiment, the hot air downstream of pre-reformer 1 combining with AIR III is split into four portions. One portion is used for pre-heating the oxidant by HX 4 before feeding to the burners. Two portions are used for heating and desulfurizing the NG1 (e.g., x %) stream is desulfurized by HX 7 and pre-heated by HDS 8 and then pre-reformed by pre-reformer 1 in the presence of steam (not shown) to convert higher hydrocarbons in the NG1 to CO and $H_2$, thereby producing a pre-reformed fuel gas that contains $CH_4$, $H_2$, CO, $CO_2$, and $H_2O$. As a result of pre-reforming the NG1 in pre-reformer 1, higher calorific heat content fuel (e.g., CO and $H_2$) may be expected. The other one portion is used for desulfurizing the NG2 stream by HDS 9 before mixing with the dry pre-reformed NG1. The desulfurized NG1 is then pre-heated with the dry pre-reformed NG2 together by HX 5. Since the NG2 is not pre-reformed, the temperature of the NG1 has to maintain below the temperature of coking temperature of hydrocarbon before feeding to the burners has to maintain below the temperature of coking temperature of higher hydrocarbons.

In the disclosed embodiments, the hot air downstream (e.g., off-air) of HXs and HDSs may have a temperature ranging from several tens of degrees Celsius to several hundred degrees Celsius (for example, from 50° C. to 300° C.) and may be recycled (not shown). For example, some may be used to generate steam, used as a general utility fluid, and/or used to drive a generator depending upon the local requirements which may vary from site to site. The energy from the off gas streams may be recovered. For example, in the optional air loop described above, the off-air is send back to the recuperator for use as cold air stream to produce the hot air stream. Another example is the off-air in the air channel may be used to generate steam if the off-air stream(s) has enough energy to boil water. Another example is the off-air streams may be used as a general utility fluid or to drive a generator depending upon the local requirements which may vary from site to site.

Here, the feedstock of the fuel gas at ambient temperature may be initially pre-heated before defulfurized in the HDS.

Furthermore, the pre-reformer, the heat exchangers and the HDSs are operated in a hot air loop, where the thermal energy (e.g., heat) of the hot air is consumed and the temperature of the hot air downstream of the pre-reformer and the heat exchangers is reduced and then recovered in the recuperator.

Alternatively, the pre-reformer, the heat exchangers and the HDSs may be operated by a hot air channel that takes a tree structure form, where the hot air may be split into several streams each applies to different components in the system, Alternatively, the pre-reformer, the heat exchangers and the HDSs may be operated by a combination of a hot air loop and a hot air channel.

In one embodiment, if energy or thermal content from the hot air is not enough to run a pre-reformer to pre-reform the total amount of a feedstock of the fuel gas, the pre-reformer may only pre-reforming a part of the total amount of the feedstock of the fuel gas. For example, x % of the total amount of the feedstock of the fuel gas is pre-reformed, where $0<x\le 100$, forming a pre-reformed fuel gas stream. In this case, the other part of the total amount of the feedstock of the fuel gas, i.e., (1−x) % non pre-reformed fuel gas stream, may be desulfurized, pre-heated and then combined with the pre-reformed fuel gas stream in the burners of the furnace for use as fuel. The non pre-reformed fuel gas stream may be pre-heated to a temperature below the coking temperature of the hydrocarbons in order to avoid carbon deposition in the furnace and the heat exchanger. Whereas, the pre-reformed fuel gas may have a temperature above the coking temperature of the hydrocarbons because long chain or higher hydrocarbons are absent in the pre-reformed fuel gas. As a result, carbon deposition in the furnace and the heat exchangers may be avoided. To simplify the system, in one embodiment, the non pre-reformed fuel gas stream may be pre-heated with the pre-reformed fuel gas together. In this case, both the pre-reformed fuel gas and the non pre-reformed fuel gas may have a temperature below the coking temperature of the hydrocarbons.

The disclosed embodiments have several advantages over the conventional furnace systems. In the above disclosed embodiments by adding a pre-reformer to the existing furnace system the combustion efficiency may be increased at least 5% comparing to the existing furnace systems. Thus, it is feasible to incorporate the pre-reformer into the furnace system. In the above disclosed embodiments, the pre-reformer is operated by the available hot air generated from a flue gas of the furnace that may not be able to operate a SMR or reformer. To this point, the combination of the pre-reformer and furnace enhances waste heat recovery. In the case of pre-reforming the total amount of a feedstock of the fuel gas (i.e., 100%), the combustion efficiency increases at least 5% comparing to the ones without cooperating a pre-reformer. Furthermore, the thermal energy required to operate the pre-reformer may be provided by hot air from the furnace system itself and available waste energy from the system should be enough to operate the pre-reformer. If the available waste energy in the system is not sufficient to operate a pre-reformer to pre-reform the total amount of a feedstock of the fuel gas (i.e., 100%), it is feasible to pre-reform a partial amount (i.e., x %, $0<x\le 100$) of feedstock of the fuel gas because it requires less thermal energy but still provides an efficiency gain of greater than 5%. Furthermore, converting higher hydrocarbons to CO and $H_2$ may increase the calorific heat contents or thermal contents of the fuel gas and eliminate coking of the higher hydrocarbons so that the temperature of the fuel gas stream and the product gas may be raised above the coking temperature of the higher hydrocarbons which appears no coking or carbon deposition. In addition, the disclosed systems and methods do not require additional equipment to recover energy from low temperature flue gas (e.g., 550° C.). The available waste thermal energy, including low temperature flue gas (e.g., 550° C.) after treatment, is enough to run the oxygen-fuel pre-heating furnace system. Thus, the capital expenditure/operating expenditure (CAPEX/OPEX) complexity of additional equipment may be avoided. To our knowledge, employing a pre-reformer in heat recovery technology is novel. By heat-integrating a pre-reformer with furnace in the manner described above, the temperature of the fuel gas may be increased without coking and the calorific heat contents at a given fuel may also be increased.

Finally, the following factors may optionally be considered for efficient pre-reformer operation with the furnace system. 1) the pressure of the pre-reformer should be minimized to increase lower heat value (LHV) gain as long as it is economically and physically workable; 2) S/C ratio needs to be maximized as long as available waste energy is enough to operate a pre-reformer; and 3) operating the pre-reformer as isothermal as possible.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations that fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"About" or "around" or "approximately" in the text or in a claim means±10% of the value stated.

"Comprising" in a claim is an open transitional term which means the subsequently identified claim elements are a nonexclusive listing i.e. anything else may be additionally included and remain within the scope of "comprising."

"Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

We claim:

1. A method for operating a glass furnace, the method comprising the steps of:
   feeding a non-pre-reformed hydrocarbon fuel gas stream to a pre-reformer forming a pre-reformed hydrocarbon fuel gas stream, wherein the pre-reformer is a low pressure pre-reformer having a pressure ranging from 1 to 5 bars;
   feeding the pre-reformed hydrocarbon fuel gas stream to burners of the furnace;
   combusting oxidant and the pre-reformed hydrocarbon fuel gas with the burners to produce flue gas;
   heating air through heat exchange with the flue gas at a recuperator; and
   transferring heat from heated air to pre-reformer tubes of the pre-reformer.

2. The method as claimed in claim 1, further comprising the step of
   feeding an additional hydrocarbon fuel gas stream to the glass furnace; and
   combusting the additional hydrocarbon fuel gas and the pre-reformed hydrocarbon fuel gas in the presence of the oxidant in the glass furnace and produce the flue gas therefrom.

3. The method as claimed in claim 2, wherein the percentage of the hydrocarbon fuel gas stream is x % of the sum of the hydrocarbon fuel gas stream and the additional pre-heated hydrocarbon fuel gas stream, where 0<x≤100.

4. The method as claimed in claim 2, wherein the hydrocarbon fuel gas and the additional hydrocarbon fuel gas are natural gas.

5. The method as claimed in claim 2, further comprising the steps of
   desulfurizing the hydrocarbon fuel gas stream before pre-reforming; and
   optionally desulfurizing the additional hydrocarbon fuel gas before feeding to the glass furnace.

6. The method as claimed in claim 5, further comprising the step of
   pre-heating the pre-reformed hydrocarbon fuel gas stream before feeding to the glass furnace; and
   pre-heating the additional hydrocarbon fuel gas before feeding to the glass furnace.

7. The method as claimed in claim 6, wherein the temperature of the pre-reformed hydrocarbon fuel gas is higher than that of the additional pre-heated hydrocarbon if the additional hydrocarbon fuel gas is pre-heated in a separate heat exchanger.

8. The method as claimed in claim 7, wherein the temperature of the additional pre-heated hydrocarbon fuel gas is below the coking temperature of the higher hydrocarbons contained in the non-pre-reformed hydrocarbon fuel gas.

9. The method as claimed in claim 1, further comprising the step of pre-heating the oxidant before feeding it to the burners.

10. The method as claimed in claim 9, wherein the oxidant is oxygen or oxygen-enriched air.

11. The method as claimed in claim 1, further comprising the step of drying the pre-reformed hydrocarbon fuel gas before feeding it to the burners.

12. The method as claimed in claim 1, wherein the pre-reformer is a non-adiabatic pre-reformer.

13. The method as claimed in claim 1, wherein the pre-reformer is a low pressure pre-reformer having a pressure ranging from 1 to 5 bars.

14. The method as claimed in claim 12, wherein the non-adiabatic pre-reformer is a quasi-isothermal pre-reformer comprising a multiple stages of adiabatic pre-formers or a multiple tube reactors where pre-reformed reactants are re-heated using the heated air between the stages or reactors, thereby maintaining the temperature of the non-adiabatic pre-reformer unchanged or fluctuated in a preferred temperature range.

15. A glass furnace system, the system comprising:
    a pre-reformer adapted and configured to receive a heated air stream and a feedstock of a hydrocarbon fuel gas stream in the presence of steam under conditions effective for pre-reforming higher hydrocarbons in the hydrocarbon fuel gas to methane, CO and $H_2$ to produce a pre-reformed hydrocarbon fuel gas stream, wherein the pre-reformer is a non-adiabatic pre-reformer;
    a glass furnace including burners adapted and configured to combust oxidant and the pre-reformed hydrocarbon fuel gas to produce flue gas; and
    a recuperator adapted and configured to perform heat exchange between the flue gas and an air stream that has a temperature lower than that of a hot air stream, so as to produce the hot air stream received by the pre-reformer.

16. The system as claimed in claim 15, further comprising a hydrodesulfurization system adapted and configured to desulfurize the hydrocarbon fuel gas;
    a dryer adapted and configured to remove water from the pre-reformed hydrocarbon fuel gas;
    a first heat exchanger adapted and configured to pre-heat the pre-reformed hydrocarbon fuel gas; and
    a second heat exchanger adapted and configured to pre-heat the oxidant.

17. The system as claimed in claim 16, further comprising an additional feedstock of the hydrocarbon fuel gas fed to the glass furnace for use as fuel.

18. The system as claimed in claim 17, further comprising a second hydrodesulfurization system adapted and configured to desulfurize the additional feedstock of the hydrocarbon fuel gas; and
    optionally a third heat exchanger adapted and configured to pre-heat the desulfurized additional feedstock of the hydrocarbon fuel gas.

19. The system as claimed in claim 18, wherein the additional feedstock of the hydrocarbon fuel gas is pre-heated by the first heat exchanger.

20. The system as claimed in claim 19, wherein the amount of the feedstock of the hydrocarbon fuel gas is x % of the sum of the feedstock of the hydrocarbon fuel gas and the additional feedstock of the hydrocarbon fuel gas, wherein $0<x\leq100$.

21. The system as claimed in claim 20, wherein the feedstock of the hydrocarbon fuel gas and the additional feedstock of the hydrocarbon fuel gas are natural gas.

\* \* \* \* \*